United States Patent Office 2,972,621
Patented Feb. 21, 1961

2,972,621

O,O-DIALKYL S-(TETRAHYDRO-2-PYRANYL) PHOSPHOROTHIOLOTHIONATES

Richard L. McConnell and Marvin A. McCall, Kingsport, Tenn., assignors to Eastman Kodak Company, Rochester, N.Y., a corporation of New Jersey No Drawing. Filed Dec. 6, 1957, Ser. No. 700,978

6 Claims. (Cl. 260—345.9)

This invention relates to new organophosphorus compounds and to a method for their preparation. In a specific aspect, this invention relates to new phosphorothiolothionates and to a method for their preparation.

Many organophosphorus compounds have been found useful in recent years as insecticides, plasticizers as well as a variety of other uses. Accordingly, it is an object of this invention to provide new organophosphorus compounds that have outstanding insecticidal activity, particularly against mites and aphids. It is another object of this invention to provide a novel method for preparing these new organophosphorus compounds. The outstanding utility of these compounds as insecticides is particularly unexpected when it is realized that closely related compounds having a similar structural formula possess little, if any, insecticidal activity at the concentrations at which these new compounds are eminently toxic against mites and aphids.

In accordance with this invention we have prepared new organophosphorus compounds having the structural formula:

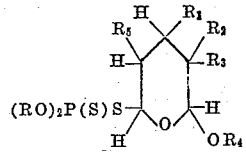

wherein R is a lower alkyl radical containing from 1 to 4 carbon atoms, $R_1$, $R_2$, $R_3$ and $R_5$ are selected from the group consisting of hydrogen and a lower alkyl radical containing from 1 to 4 carbon atoms and $R_4$ is also a lower alkyl radical containing 1 to 4 carbon atoms.

The compounds of this invention are prepared by reacting a dialkyl phosphorothiolothionate having the structural formula:

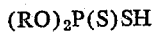
(RO)$_2$P(S)SH wherein R is as defined above with a substituted dihydropyran having the structural formula:

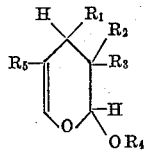

wherein $R_1$, $R_2$, $R_3$, $R_4$ and $R_5$ are as defined above.

The reaction forming the compounds of this invention is usually carried out by slowly adding one of the reactants to the other reactant and any mode of addition of the reactants can be employed. The reaction is ordinarily carried out at a temperature within the range of —25 to 150° C., preferably within the range of 25 to 100° C. The molar ratio of reactants can be varied rather widely, but it is preferable to employ equal molar quantities of the reactants for the most desirable results. It is possible to conduct the reaction in the absence of any solvent medium, but if a solvent is employed, normally liquid hydrocarbons and their halogenated derivatives can be used. Suitable solvents are normally liquid aliphatic and aromatic hydrocarbons such as pentane, hexane, heptane, octane, benzene, toluene, xylene, and the chlorinated derivatives of these hydrocarbons. The reaction can be conducted in the absence of any catalyst, but if a catalyst is desired for the reaction, basic catalysts such as tertiary amines, and in particular trialkyl amines such as triethyl amine, are quite suitable. The period for reaction generally varies from about ½ to 8 hours.

The dihydropyrans that are employed to produce the compounds of this invention can be readily prepared by the reaction of an alkenyl ether with an α,β-unsaturated aldehyde or ketone such as acrolein and crotonaldehyde. A specific procedure for producing the dihydropyrans is disclosed by Longley et al. in JACS 72, 3079 (1950).

The compounds of this invention and their preparation, as well as their utility, are described in the following examples:

EXAMPLE 1

O,O-diethyl S-(6-ethoxytetrahydro-2-pyranyl) phosphorothiolothionate

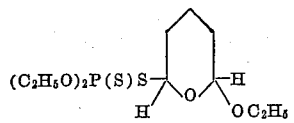

Diethyl phosphorothiolothionate (0.1 mole) was placed in a flask and stirred while 2-ethoxy-3,4-dihydro-2H-pyran (0.1 mole) was added dropwise. The reaction is exothermic, and the temperature of the reaction mixture rose to 65° C. About 15 minutes were required to add the 2-ethoxy-3,4-dihydro-2H-pyran. After the temperature of the reaction mixture had dropped to 25° C., it was heated on the steam bath with stirring for 15 minutes. The product was then stripped under reduced pressure (1–2 mm.) to remove volatile impurities. The product was a light yellow oil, $n_D^{20}$ 1.5115.

EXAMPLE 2

O,O-diethyl S-(tetrahydro-6-methoxy-4-methyl-2-pyranyl) phosphorothiolothionate

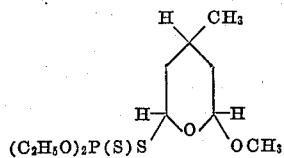

This compound was prepared from diethyl phosphorothiolothionate (0.1 mole) and 2-methoxy-4-methyl-3,4-dihydro-2H-pyran (0.1 mole) according to the procedure of Example 1, $n_D^{20}$ 1.5120.

EXAMPLE 3

O,O-diethyl S-(6-ethoxy-4,5,5-trimethyltetrahydro-2-pyranyl) phosphorothiolothionate

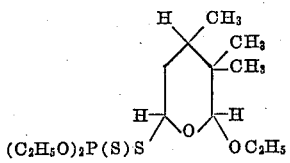

This compound was prepared from 2-ethoxy-3,3,4-trimethyl-3,4-dihydro-2H-pyran (0.1 mole) and diethyl phosphorothiolothionate (0.1 mole) according to the procedure of Example 1.

EXAMPLE 4

*O,O-dimethyl S-(6-ethoxy-5,5-dimethyltetrahydro-2-pyranyl) phosphorothiolothionate*

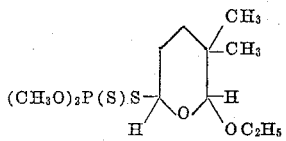

This compound was prepared from dimethyl phosphorothiolothionate (0.1 mole) and 2-ethoxy-3,3-dimethyl-3,4-dihydro-2H-pyran (0.1 mole) according to the procedure of Example 1.

EXAMPLE 5

*O,O-diisopropyl S-(6-methoxy-3-methyltetrahydro-2-pyranyl) phosphorothiolothionate*

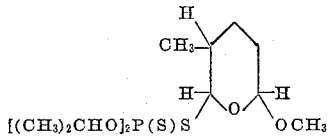

This compound was prepared from diisopropyl phosphorothiolothionate (0.1 mole) and 2-methoxy-5-methyl-3,4-dihydro-2H-pyran (0.1 mole) according to the procedure of Example 1.

EXAMPLE 6

*O,O-diisobutyl S-(6-methoxytetrahydro-2-pyranyl) phosphorothiolothionate*

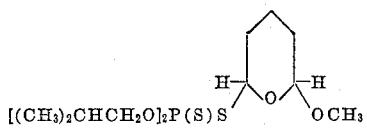

This compound was prepared from diisobutyl phosphorothiolothionate (0.1 mole) and 2-methoxy-3,4-dihydro-2H-pyran according to the procedure of Example 1.

EXAMPLE 7

*O-ethyl O-methyl S-(6-ethoxytetrahydro-2-pyranyl) phosphorothiolothionate*

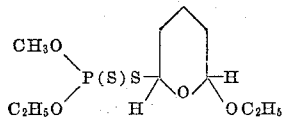

This light yellow oil was prepared from O-ethyl O-methyl phosphorothiolothionate (0.1 mole) and 2-ethoxy-3,4-dihydro-2H-pyran (0.1 mole) according to the procedure of Example 1, $n_D^{20}$ 1.5186.

EXAMPLE 8

*O-ethyl O-propyl S-(tetrahydro-6-methoxy-4-methyl-2-pyranyl) phosphorothiolothionate*

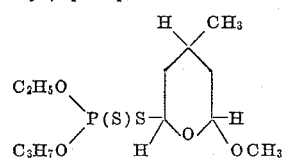

This compound was prepared from O-ethyl O-propyl phosphorothiolothionate (0.1 mole) and 2-methoxy-4-methyl-3,4-dihydro-2H-pyran (0.1 mole) according to the procedure of Example 1, $n_D^{20}$ 1.5030.

EXAMPLE 9

*O-ethyl O-methyl S-(tetrahydro-6-methoxy-4-methyl-2-pyranyl) phosphorothiolothionate*

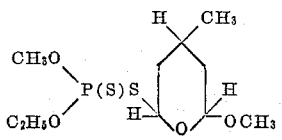

This compound was prepared from O-ethyl O-methyl phosphorothiolothionate (0.1 mole) and 2-methoxy-4-methyl-3,4-dihydro-2H-pyran (0.1 mole) according to the procedure of Example 1, $n_D^{20}$ 1.5000.

EXAMPLE 10

*O,O-dimethyl S-(6-ethoxytetrahydro-2-pyranyl) phosphorothiolothionate*

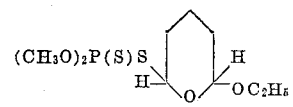

This light yellow oily product was prepared from dimethyl phosphorothiolothionate (0.1 mole) and 2-ethoxy-3,4-dihydro-2H-pyran (0.1 mole) according to the procedure of Example 1, $n_D^{20}$ 1.5332.

EXAMPLE 11

*Use of compounds as insecticides.*—Tests against mites were carried out in the following manner. Acetone solutions containing 1% of the candidate compounds were prepared and diluted with water to give solutions of the desired concentration for testing. Two heavily infested bean leaves containing adult two-spotted mites (*Tetranychus bimaculatus* Harvey) were carefully dipped in the above solutions and dried in a gentle air stream. The leaves were placed on damp paper toweling in Petri dishes and observed after 24 hours for mortality among the adult mites.

It should be noted that tests using acetone-water solutions (containing none of the toxicant) kill none of the mites.

TABLE 1

| Compound | Concentration of Compound in p.p.m. | Mites, Percent Kill | Aphids, Percent Kill |
|---|---|---|---|
| 1. Product of Example 1 | 100 | 100 | 100 |
|  | 30 | 100 | 100 |
|  | 10 | 100 | 100 |
| 2. Product of Example 2 | 100 | 92 | 95 |
|  | 30 | 93 | 97 |
|  | 10 | 94 | 93 |
| 3. O,O-Diethyl S-(tetrahydro-2-pyranyl) phosphorothiolothionate | 100 | 79 | 0 |
|  | 30 | 10 | 0 |
|  | 10 | 0 | 0 |

The products of Examples 3 to 10 produce results comparable to the products of Examples 1 and 2.

The unexpectedly high toxicity of the compounds of the invention against mites and aphids is apparent from the data in the above table. Compounds 1 and 2 are highly toxic to mites and aphids even at low concentrations while compound 3 is only slightly toxic to mites and ineffective against aphids. To be effective insecticides the percent kill at a concentration of 100 p.p.m. should be at least 85%. Compound 3 differs from the products of this invention only in the absence of an alkoxy group on the heterocyclic ring and normally such a slight difference in chemical compounds is not expected to produce such an outstanding difference in toxicity against certain insects.

We claim:

1. Organophosphorus compounds having the structural formula:

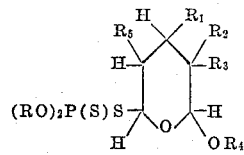

wherein R and $R_4$ are lower alkyl radicals and $R_1$, $R_2$, $R_3$ and $R_5$ are selected from the group consisting of hydrogen and lower alkyl radicals.

2. O,O-diethyl S-(6-ethoxytetrahydro-2-pyranyl) phosphorothiolothionate.

3. O,O-diethyl S-(tetrahydro-6-methoxy-4-methyl-2-pyranyl) phosphorothiolothionate.

4. O,O-diethyl S-(6-ethoxy-4,5,5-trimethyltetrahydro-2-pyranyl) phosphorothiolothionate.

5. O,O-dimethyl S-(6-ethoxy-5,5-dimethyltetrahydro-2-pyranyl) phosphorothiolothionate.

6. O-ethyl O-methyl S-(tetrahydro-6-methoxy-4-methyl-2-pyranyl) phosphorothiolothionate.

References Cited in the file of this patent

UNITED STATES PATENTS

| | | |
|---|---|---|
| 2,725,327 | Diveley | Nov. 29, 1955 |
| 2,766,171 | Diveley | Oct. 9, 1956 |

FOREIGN PATENTS

| | | |
|---|---|---|
| 739,128 | Great Britain | Oct. 26, 1955 |

OTHER REFERENCES

Frear et al.: J. of Econ. Ent., vol. 40, pp. 736–741 (1947).